(12) United States Patent
Klode et al.

(10) Patent No.: US 7,347,305 B2
(45) Date of Patent: Mar. 25, 2008

(54) PARK BRAKE SYSTEM HAVING A LATCHING DEVICE

(75) Inventors: Harald Klode, Centerville, OH (US); John B Hageman, Vandalia, OH (US); Paul Rymoff, Jr., Bellbrook, OH (US)

(73) Assignee: Delphi Technologies, Inc., Troy, MI (US)

( * ) Notice: Subject to any disclaimer, the term of this patent is extended or adjusted under 35 U.S.C. 154(b) by 716 days.

(21) Appl. No.: 10/954,736

(22) Filed: Sep. 30, 2004

(65) Prior Publication Data

US 2005/0082908 A1    Apr. 21, 2005

Related U.S. Application Data

(60) Provisional application No. 60/511,901, filed on Oct. 16, 2003.

(51) Int. Cl.
*B60L 7/00* (2006.01)
(52) U.S. Cl. ............... 188/161; 188/163; 188/164
(58) Field of Classification Search ........... 188/161, 188/163, 164, 156, 166, 171
See application file for complete search history.

(56) References Cited

U.S. PATENT DOCUMENTS

| 5,549,183 | A | 8/1996 | Buchanan, Jr. et al. |
| 5,765,671 | A | 6/1998 | Endo et al. |
| 5,949,168 | A | 9/1999 | Dieckmann et al. |
| 6,000,489 | A | 12/1999 | Rick |
| 6,089,360 | A | 7/2000 | Borgardt |
| 6,269,917 | B1 | 8/2001 | Harting et al. |
| 6,460,661 | B1 * | 10/2002 | Heckmann .......... 188/158 |
| 6,536,561 | B1 * | 3/2003 | Keller ............ 188/71.8 |
| 6,744,162 | B2 | 6/2004 | Pierre et al. |
| 6,976,563 | B1 * | 12/2005 | Shaw ............. 188/265 |
| 7,066,304 | B2 * | 6/2006 | Severinsson ........ 188/72.8 |
| 2004/0055835 | A1 | 3/2004 | Klode et al. |
| 2005/0279592 | A1 * | 12/2005 | Shaw ............. 188/163 |

* cited by examiner

*Primary Examiner*—David M. Fenstermacher
(74) *Attorney, Agent, or Firm*—Scott A. McBain

(57) ABSTRACT

An actuator for an electro-mechanical-brake motor assembly includes a housing surrounding a rotatable motor shaft presenting a longitudinal axis. A spring is non-rotatably supported on the housing. A latching device is non-rotatably supported by the housing. The latching device has a plurality of teeth. A latch gear is non-rotatably supported on the rotatable motor shaft and circumscribes the longitudinal axis and presents a plurality of axially facing angled teeth presenting a meshing engagement with the teeth of the latching device. The latching device is axially movable relative to the housing in response to magnetic force generated by the electric coil.

19 Claims, 5 Drawing Sheets

PARK BRAKE SYSTEM HAVING A LATCHING DEVICE

RELATED APPLICATION

The subject patent application claims priority to and all the benefits of U.S. Provisional Patent Application Ser. No. 60/511,901 filed on Oct. 16, 2003.

FIELD OF THE INVENTION

The subject invention relates to a parking brake system and latch actuator. More specifically, the subject invention relates to the parking brake system having an electric caliper assembly.

BACKGROUND OF THE INVENTION

Typically, a motor for an automotive vehicle includes electro-mechanical-brake (EMB) assembly used to power electro mechanical brakes, also known as electric brake calipers. Typically, the electro mechanical brakes, utilize an electric motor positioned relative to a caliper housing to drive through intervening planetary or other gears, which act as a force multiplier, an inline rotatable ballscrew of a ballscrew subassembly positioned within the caliper housing. The rotating ballscrew linearly moves a ballnut of the ballscrew subassembly. The ballnut is connected to and linearly moves an inner brake pad against a brake rotor of the automotive vehicle.

An outer brake pad, mounted to the caliper housing, is positioned on an opposite side of the brake rotor. Therefore, during braking, the inner brake pad will be forced against the rotor and a resulting reactionary force will pull the outer brake pad into engagement with the opposite side of the rotor. Engagement of the inner and outer brake pads with the rotor will slow and stop the vehicle or hold a stopped vehicle in a fixed position. To set the brake as a parking brake, a separate electric motor is used to move a locking mechanism into engagement with a latch gear attached to a drive shaft of the EMB electric motor. This separate electric motor requires extra space thereby disadvantageously diminishing packaging characteristics of the EMB assembly.

Alluding to the above, various electric motor assemblies are currently used in the automotive industry. Such assemblies are disclosed in the U.S. Pat. No. 5,549,183 to Buchanan, Jr. et al.; U.S. Pat. No. 5,949,168 to Dieckmann et al; U.S. Pat. No. 5,765,671 to Endo et al.; U.S. Pat. No. 6,000,489 to Rick; U.S. Pat. No. 6,089,360 to Borgardt; U.S. Pat. No. 6,269,917 to Harting et al.; and U.S. Pat. No. 6,744,162 to Pierre et al. Other prior art designs tried to solve the aforementioned disadvantages by implementing a design, which eliminates the need for the separate electric motor but does not improve magnetic flux path between latching components of the EMB assembly such as a spring and an electromagnetic device necessary for efficient latching engagement between the motor shaft and the caliper housing.

Accordingly, there is a need for a park brake system having a mechanism positioned therein with the park brake system having improved packaging characteristics and improved latching or meshing engagement between the components of the park brake system.

SUMMARY OF THE INVENTION

An actuator for an electro-mechanical-brake motor assembly includes a rotatable motor shaft having a longitudinal axis. A housing surrounds the rotatable motor shaft. A latch gear is non-rotatably supported on the rotatable shaft circumscribing the longitudinal axis. An electromagnetic device is disposed within the housing circumscribing the longitudinal axis. A spring is supported on the housing and circumscribes the longitudinal axis. The spring extends radially and outwardly about the latch gear. A latching device presents a keyed connection with the housing to prevent relative rotation therebetween while allowing relative axial movement therealong. The latching device is supported by the spring for axial movement between a non-latched position and latched position in engagement with the latch gear in response to a magnetic force generated by the electromagnetic device and against the biasing action of the spring to flex the spring to prevent a rotational movement of the rotatable motor shaft.

Accordingly, the subject invention overcomes the disadvantages of the prior art by providing the improved design of the actuator having the latching device axially movable relative to the housing to prevent rotational movement of the rotatable motor shaft.

Another advantage of the present invention is to provide the actuator for the electro-mechanical-brake motor assembly having improved packaging characteristics.

Still another advantage of the present invention is to provide the actuator for the electro-mechanical-brake motor assembly having improved magnetic flux path between the spring and the electromagnetic device for improved latching engagement between the rotatable motor shaft and the housing.

BRIEF DESCRIPTION OF THE DRAWING

Other advantages of the present invention will be readily appreciated as the same becomes better understood by reference to the following detailed description when considered in connection with the accompanying drawing wherein.

DETAILED DESCRIPTION OF THE PREFERRED EMBODIMENT

Figure 1:
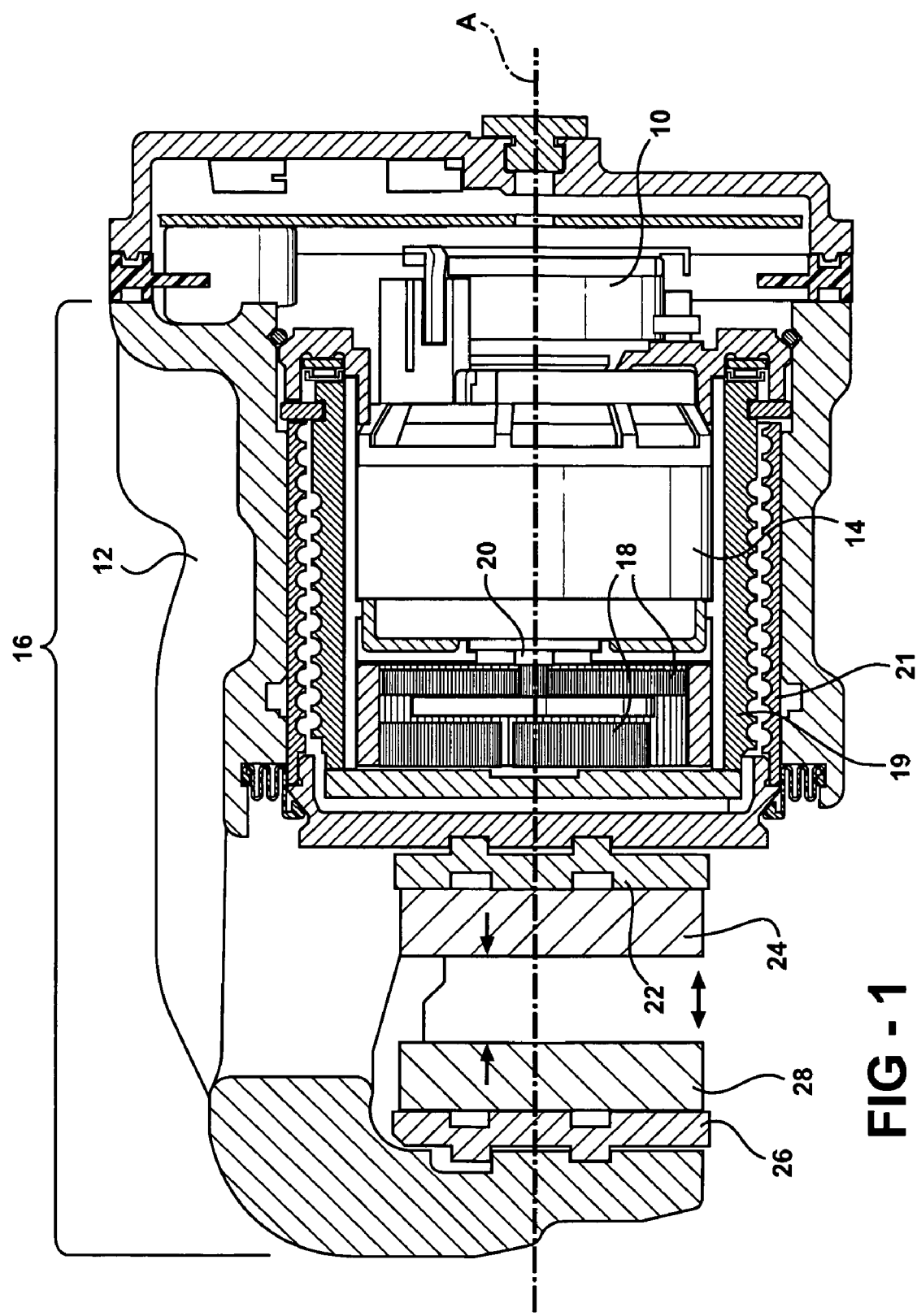
FIG. 1 is a cross sectional view of an electro-mechanical brake (EMB) assembly and a park brake assembly packaged therewithin.

Referring to FIG. 1, the invention relates to an actuator or a park brake device 10 packaged within an electromechanical brake (EMB) assembly 12 of a vehicle (not shown), wherein the EMB assembly 12 also performs primary braking operation. For primary braking operation, the EMB assembly 12 includes an electric motor 14 positioned internally relative to a caliper housing 16. A set of planetary gears 18 are coupled to a rotatable motor shaft 20 for driving an inline rotatable ballscrew 19 positioned in the caliper housing 16. The electric motor 14 drives the ballscrew resulting in rotating the ballscrew and moving a ballnut 21 in a linear manner. The ballnut is coupled against and linearly moves an inner brake shoe 22. An inner brake pad 24 is coupled to the inner brake shoe 22. As the inner brake pad 24 is forced against an inboard side of a rotor (not shown), the reaction force on the caliper housing 16 pulls an outer brake shoe 26 which also has an outer brake pad 28, into engagement with an outboard side of the rotor. The resulting interaction between the inner and outer brake pads 24 and 28 against the rotor will cause the vehicle to slow down or stop.

Figure 2:
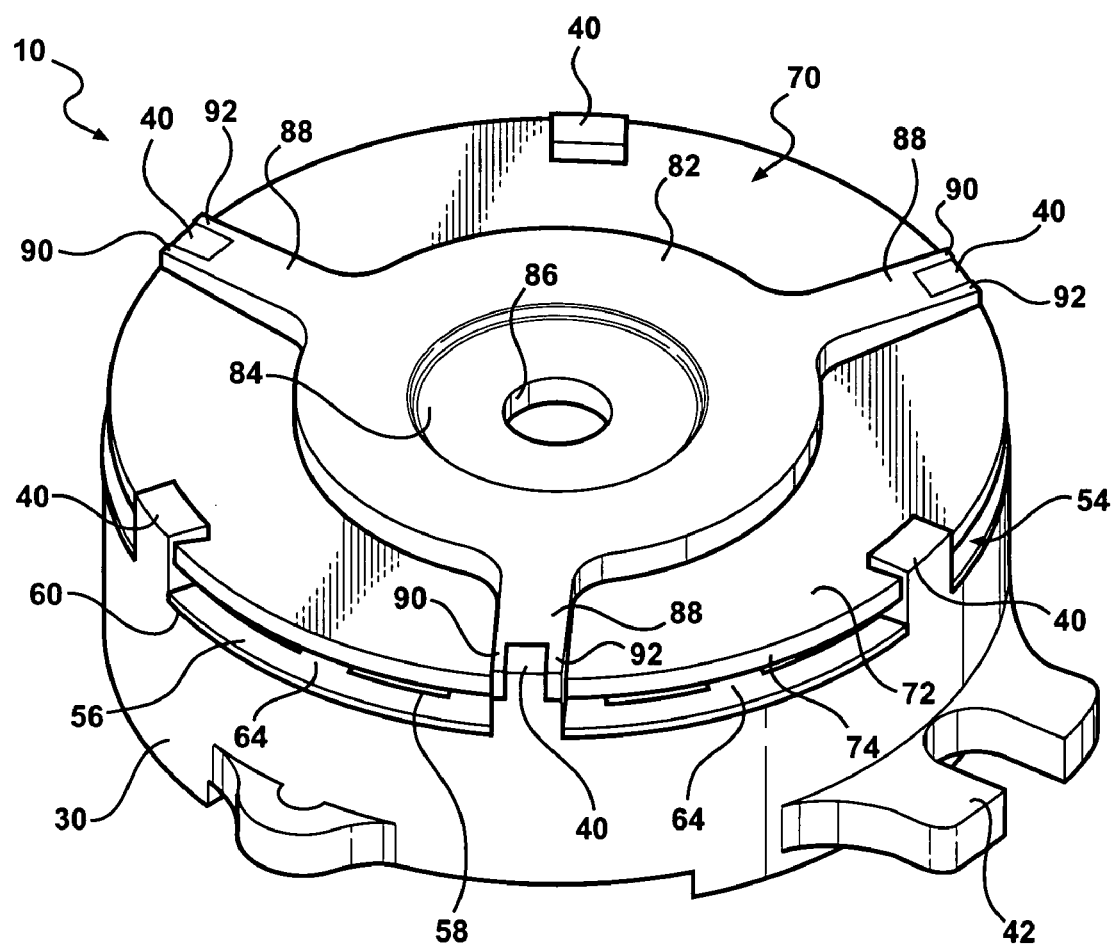
FIG. 2 is a perspective view of the park brake assembly.
Figure 3:
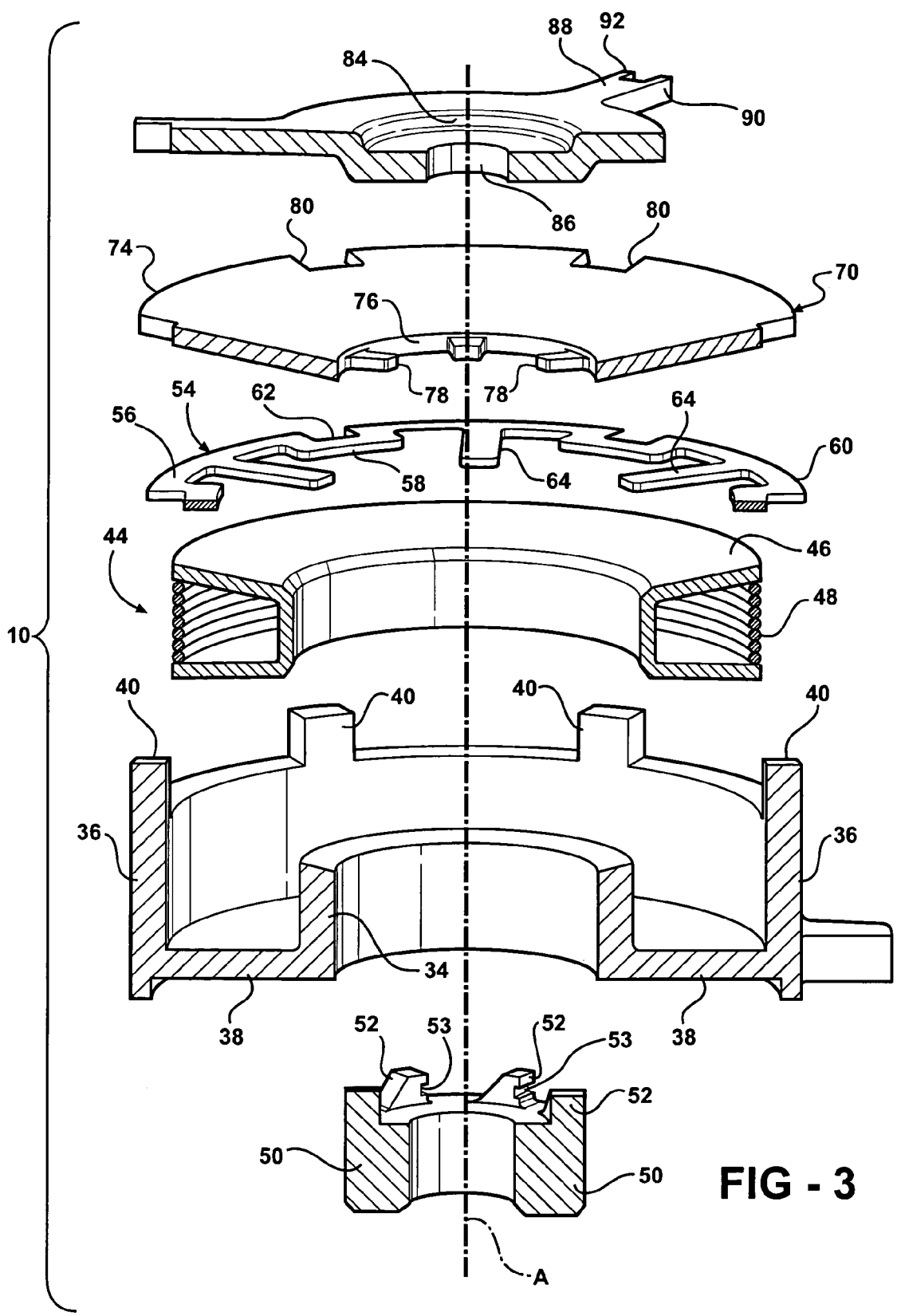
FIG. 3 is an exploded cross sectional view of the park brake assembly.
Figure 4:
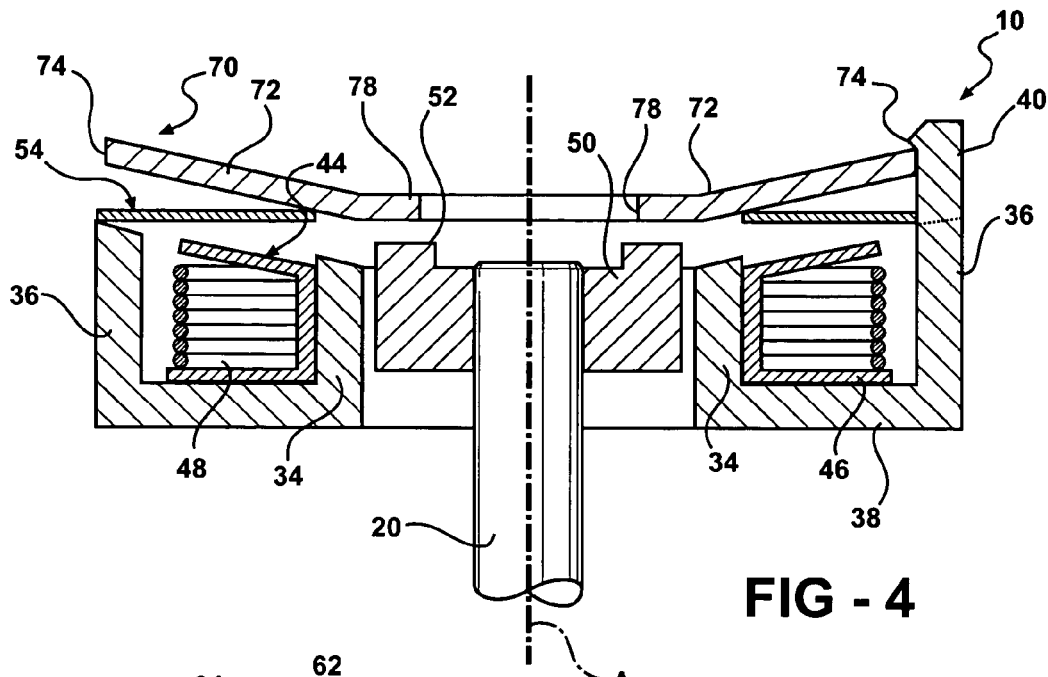
FIG. 4 is a partial cross sectional view of the park brake assembly.

Referring to FIGS. 2 through 4, the park brake device 10, which is packaged inboard the electric motor 14 and caliper housing 16, locks the rotatable motor shaft 20 of the electric motor 14 after the park brake device 10 has been enabled. The park brake device 10 comprises a solenoid member or housing 30 made from a magnetically soft material. The housing 30 includes inner 34 and outer 36 annular walls spaced one from the other and interconnected by a bottom 38. The rotatable motor shaft 20 extends through the inner annular wall 34. The outer annular wall 36 includes a plurality of tabs 40 integral with and extending outwardly therefrom. A female fastener 42 is integral with the outer annular wall 36 adaptable to receive complimentary male fastener (not shown) to attach the housing 30 within the EMB assembly 12.

An electromagnetic device, generally indicated at 44, is housed between inner 34 and outer 36 annular walls of the housing 30. The electromagnetic device 44 includes a bobbin 46 having a wound electric coil 48. The bobbin 46 is coaxially aligned with the longitudinal axis A and circumferentially surrounds the inner annular wall 34. A latch gear 50 is non-rotatably supported on the rotatable motor shaft 20 and disposed between the inner annular wall 34 and the rotatable motor shaft 20. The latch gear 50 includes a plurality of axially facing angled teeth 52. Each axially facing angled tooth 52 includes a notch 53 defined therein. A power source (not shown) is connected to the electric coil 48 for generating the magnetic force by the electromagnetic device 44.

Figure 5:
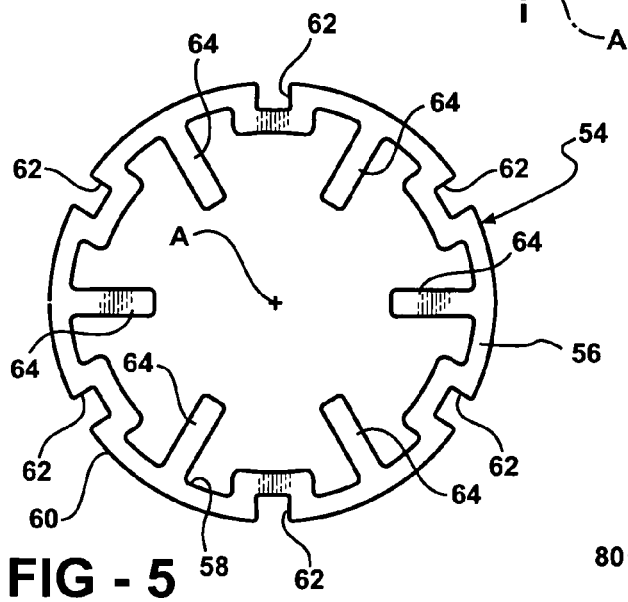
FIG. 5 is a top view of a spring of the park brake assembly.

Referring to FIGS. 3 through 5, a spring, generally indicated at 54, is non-rotatably supported on and is positioned within the housing 30 circumscribing the longitudinal axis A. Preferably, the spring 54 is formed from a magnetic material. Alternatively, the spring 54 may be formed from a non-magnetic material. The spring 54 extends radially and outwardly about the latch gear 50. The spring 54 presents an annular ring 56 having inner circumference 58 and outer circumference 60. The spring 54 presents a spring connection defined between the housing 30 and the spring 54 to prevent relative rotation therebetween. The spring connection is further defined by a plurality of radially spaced female connectors or openings 62 are defined in the outer circumference 60 with the openings 62 engaging the respective tabs 40 extending from the outer annular wall 36 of the housing 30. A plurality of radially spaced fingers 64 extend from the inner circumference 58 of the annular ring 56 and transversely to the longitudinal axis A with the radially spaced fingers 64 positioned below a latching device, generally indicated at 70, with the fingers 64 holding the latching device 70 in non-meshing position.

Figure 6:
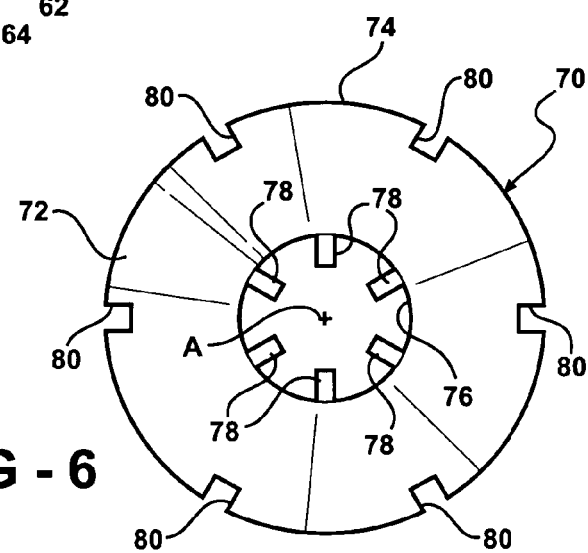
FIG. 6 is a top view of a cone shaped latching device of the park brake assembly.

Referring to FIG. 6, the aforementioned latching device 70 is supported by the spring 54. The latching device 70 is formed from a magnetically soft material. The latching device 70 presents a keyed connection with the housing 30 to prevent relative rotation therebetween while allowing relative axial movement therealong. The latching device 70 moves between a non-latched position and latched position in engagement with the latch gear 50 in response to a magnetic force generated by the electromagnetic device 44 and against the biasing action of the spring 54 to flex said spring 54 to prevent a rotational movement of the rotatable motor shaft 20. The spring 54 is deflected toward the bobbin 46 of the electromagnetic device 44 in response to a magnetic force generated by the electromagnetic device 44 to effect the latching engagement between the latching device 70 and the latch gear 50. The latching device 70 is further defined by an annular disc 72 having a conical configuration and extending into a peripheral edge 74. The annular disc 72 presents an opening 76 defined therein to receive the rotatable motor shaft 20. The annular disc 72 includes a plurality of radially spaced teeth 78 extending from the annular disc 72 to the opening 76 and transversely to the longitudinal axis A. The radially spaced teeth 78 extend angularly relative to the disc 72, as best shown in FIG. 4. The number of the teeth 78 of the latching device 70 is equal to the number of teeth 52 of the latch gear 50. Alternatively, the number of the teeth 78 of the latching device 70 may be less than the number of teeth 52 of the latch gear 50. The peripheral edge 74 of the annular disc 72 includes a plurality of radially spaced cut-out portions 80 defined therein to engage the tabs 40 extending from the outer annular wall 36 of the housing 30 to define the aforementioned keyed connection.

A retainer member 82, as best shown in FIGS. 2 and 3, extends over the latching device 70 for holding the latching device 70 in the housing 30. The retainer member 82 includes a circular core 84 having an opening 86. A plurality of spikes 88 are integral with and extend radially from the circular core 84 to respective distal ends 90. Each distal end 90 presents a mechanical connection defined by a female connector 92 to mechanically connect with the tabs 40 extending from the outer annular wall 36 of the housing 30.

Figure 7:
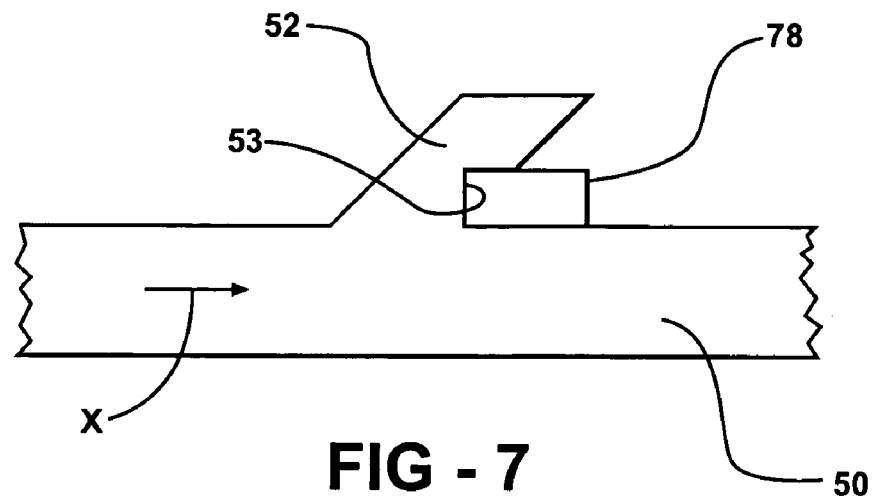
FIG. 7 shows a schematic view of a latched engagement between a latch gear including one tooth and an edge of a tooth of the latching device.
Figure 8:
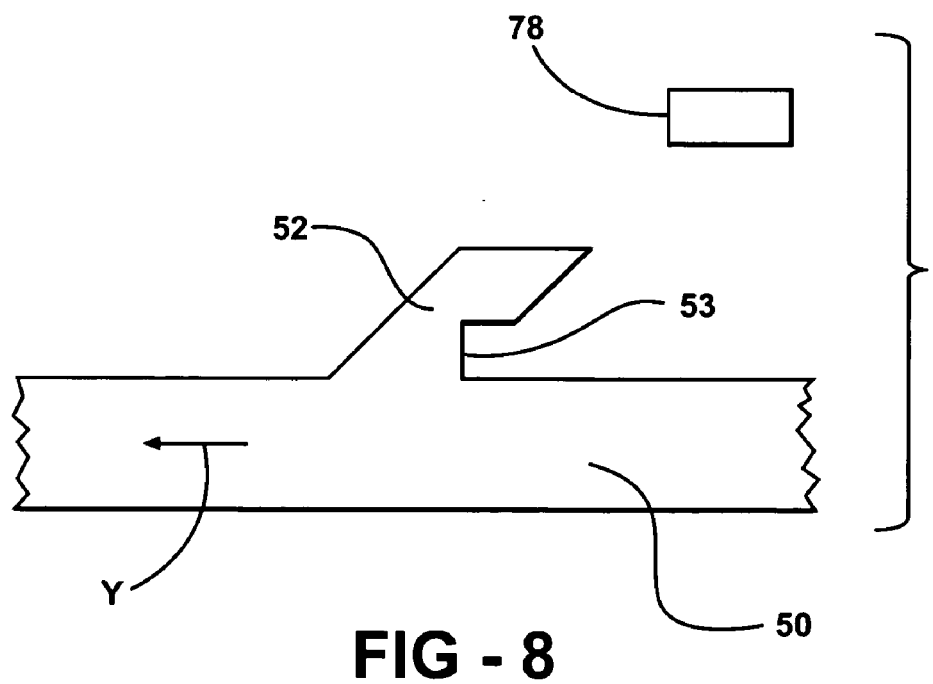
FIG. 8 shows a schematic view of a non-latched disengagement between the latch gear including one tooth and the edge of the tooth of the latching device.

In operation, when a driver applies a foot brake (not shown) to slow and stop the vehicle by energizing the EMB assembly 12 to rotate the shaft 20 and the gear 50 in a forward rotational, i.e. counterclockwise direction, as shown at Y in FIG. 8. The operation of EMB assembly 12, which includes the electric motor 14, the planetary or other gears 18, the ballscrew or other assemblies, and the inner brake pad 24 and the outer brake pad 28, to slow and stop the vehicle is well known to those skilled in the art. With the foot brake released or still applied, the driver pushes the parking-brake button (not shown in the present invention) on a dashboard (not shown) to energize the electric coil 48. When the electric coil 48 is energized, the magnetic flux formed between the electromagnetic device 44, the solenoid housing 30, the spring 54, and the latching device 70, longitudinally deflects the fingers 64 of the spring 54 toward the electromagnetic device 44 and pulls the latching device 70 to the latch gear 50. The longitudinally-deflected fingers 64 lower the latching device 70 supported by the fingers 64 by moving the latching device 70 into latching engagement with the latch gear 50 to prevent a rotational movement of the rotatable motor shaft 20. The anti-rotational force is taken by the teeth 78 on the latching device 70. The electric coil 48 is then de-energized and the latching device 70 remains locked, i.e. in the latched position, as shown in FIG. 7.

Alluding to the above, when the driver pushes the parking-brake button again, and thereafter energizes the electric motor 14, by which then rotates the latch gear 50 to a higher torque level than the initial torque to set the park brake, i.e. counter clockwise direction, as shown at Y in FIG. 8, thereby rotating the latch gear 50 and the axially facing angled teeth 52 extending therefrom out of engagement with the teeth 78 of the latching device 70 with the teeth 78 disengaging from the respective notches 53. The fingers 64 of the spring 54, return to its non-deflected state thereby acting as a spring to push the axially movable latching device 70 from the latched position at increased speed thereby releasing the parking brake.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An actuator for an electro-mechanical-brake motor assembly, said actuator comprising;
    a rotatable motor shaft having a longitudinal axis,
    a housing surrounding said rotatable motor shaft,
    a latch gear non-rotatably supported on said rotatable motor shaft with said latch gear circumscribing said longitudinal axis,
    an electromagnetic device disposed within said housing circumscribing said longitudinal axis,
    a spring supported by said housing and circumscribing said longitudinal axis and extending radially outwardly about said latch gear, and
    a latching device presenting a keyed connection with said housing to prevent relative rotation therebetween while allowing relative axial movement therealong and supported by said spring for axial movement between a non-latched position and latched position in engagement with said latch gear in response to a magnetic force generated by said electromagnetic device and against the biasing action of said spring to flex said spring to prevent a rotational movement of said rotatable motor shaft.

2. An actuator as set forth in claim 1 wherein said spring is further defined by an annular ring having inner circumference and outer circumference with a plurality of spaced fingers extending from said inner circumference to said longitudinal axis with said fingers positioned below said latching device for holding said latching device in said non-latched position.

3. An actuator as set forth in claim 2 wherein said spring presents a spring connection defined between said spring and said housing to prevent relative rotation therebetween.

4. An actuator as set forth in claim 3 wherein said spring connection is further defined by an outer annular wall having a plurality of tabs integral with and extending outwardly therefrom and an inner annular wall spaced from said outer annular wall and a bottom interconnecting said inner annular wall and said outer annular wall.

5. An actuator as set forth in claim 3 wherein said spring connection is further defined by a plurality of spaced female connectors defined in said outer circumference with said female connectors engaging said tabs to prevent relative rotation therebetween.

6. An actuator as set forth in claim 5 wherein said latching device is further defined by an annular disc extending to a peripheral edge.

7. An actuator as set forth in claim 6 wherein said keyed connection is further defined a plurality of radially spaced cut-out portions defined in said peripheral edge with said cut-out portions engaging said tabs to prevent relative rotation between said latching device and said housing while allowing relative axial movement of said latching device along said rotatable motor shaft.

8. An actuator as set forth in claim 7 wherein said annular disc presents a conical configuration.

9. An actuator as set forth in claim 8 wherein said annular disc presents an opening defined therein to receive said rotatable motor shaft.

10. An actuator as set forth in claim 9 wherein said latching device includes a plurality of radially spaced teeth extending from said annular disc to said opening.

11. An actuator as set forth in claim 10 wherein said latch gear includes a plurality of axially facing angled teeth each including a notch defined therein with said axially facing angled teeth presenting a meshing engagement with said teeth in said latching position for preventing rotation of said rotatable motor shaft relative to said housing.

12. An actuator as set forth in claim 11 wherein the number of said axially facing angled teeth is equal to the number of said teeth of said latching device.

13. An actuator as set forth in claim 11 wherein the number of said axially facing angled teeth is different from the number of said teeth of said latching device.

14. An actuator as set forth in claim 13 wherein said electromagnetic device includes a bobbin having a wound electric coil with said bobbin coaxially aligned with said longitudinal axis and circumferentially surrounding said latch gear.

15. An actuator as set forth in claim 14 including a power source connected to said wound electric coil for generating the magnetic force for bending said radially spaced fingers.

16. An actuator as set forth in claim 4 wherein said latching device includes a retainer member presenting a mechanically connection with said housing and extending over said latching device for holding said latching device on said housing.

17. An actuator as set forth in claim 16 wherein said retainer member includes a circular core having an opening to receive said rotatable motor shaft.

18. An actuator as set forth in claim 17 wherein said retainer member further includes a plurality of spikes integral with and extending radially from said circular core to respective distal ends.

19. An actuator as set forth in claim 18 wherein said mechanical connection is further defined a female connector at each said distal end to mechanically connect with said tabs extending from said outer annular wall of said housing.

\* \* \* \* \*